US005550571A

United States Patent [19]

Shoji

[11] Patent Number: 5,550,571
[45] Date of Patent: Aug. 27, 1996

[54] METHOD OF AND APPARATUS FOR THERMALLY RECORDING IMAGES

[75] Inventor: Takashi Shoji, Kanagawa-ken, Japan

[73] Assignee: Fuji Photo Film Co., Ltd, Kanagawa, Japan

[21] Appl. No.: 288,614

[22] Filed: Aug. 10, 1994

[30] Foreign Application Priority Data

Aug. 20, 1993 [JP] Japan .................. 5-206210

[51] Int. Cl.$^6$ .................. B41J 2/415
[52] U.S. Cl. .................. 347/133; 347/207
[58] Field of Search .................. 347/133, 207, 347/212, 208, 209; 374/7

[56] References Cited

U.S. PATENT DOCUMENTS

| 4,522,510 | 6/1985 | Rosencwaig et al. | 374/7 |
| 5,432,537 | 7/1995 | Imakawa et al. | 347/133 |

FOREIGN PATENT DOCUMENTS

| 50-23617 | 3/1975 | Japan . |
| 58-94494 | 6/1983 | Japan . |
| 62-78964 | 4/1987 | Japan . |
| 62-77983 | 4/1987 | Japan . |
| 5-24219 | 2/1993 | Japan . |
| 5-301447 | 11/1993 | Japan . |
| 6-198924 | 7/1994 | Japan . |
| 6-198925 | 7/1994 | Japan . |

*Primary Examiner*—Mark J. Reinhart
*Attorney, Agent, or Firm*—Sughrue, Mion, Zinn, Macpeak & Seas

[57] ABSTRACT

A thermal recording apparatus includes a laser beam generator for emitting a laser beam to record an image or the like on a thermosensitive recording medium, a preheating device for preheating the thermosensitive recording medium to a temperature lower than a coloring temperature thereof, an auxiliary scanning feeder for feeding the thermosensitive recording medium in an auxiliary scanning direction, and a controller for establishing a scanning interval employed when the image is to be recorded on the thermosensitive recording medium, depending on an amount of thermal deformation by which the thermosensitive recording medium is deformed when heated to the temperature lower than the coloring temperature. The thermal recording apparatus can record an image of desired dimensions on the thermosensitive recording medium without being adversely affected by shrinkage or expansion caused when the thermosensitive recording medium is heated before or after the image is recorded thereon.

3 Claims, 3 Drawing Sheets

METHOD OF AND APPARATUS FOR THERMALLY RECORDING IMAGES

BACKGROUND OF THE INVENTION

1. Field of the Invention:

The present invention relates to a method of and an apparatus for thermally recording an image or the like on a thermosensitive recording medium by applying a laser beam or the like to the thermosensitive recording medium.

2. Description of the Related Art:

Thermosensitive recording apparatus for applying thermal energy to a thermosensitive recording medium to record an image or other information thereon are in wide use. Particularly, thermosensitive recording apparatus which employ a laser as a thermal energy source for high-speed recording are known from Japanese laid-open patent publications Nos. 50-23617, 58-94494, 62-77983, and 62-78964, for example.

The applicant has developed a thermosensitive recording medium capable of recording a high-quality image for use in such thermosensitive recording apparatus. The thermosensitive recording medium comprises a support coated with a coloring agent, a color developer, and light-absorbing dyes, and produces a color whose density depends on the thermal energy that is applied to the thermosensitive recording medium. For details, reference should be made to Japanese laid-open patent publications Nos. 5-301447 and 5-24219.

The thermosensitive recording medium has a thermosensitive layer on the support. The thermosensitive layer is produced by coating a coating solution on the support. The coating solution contains an emulsion which is prepared by dissolving microcapsules containing at least a basic dye precursor, a color developer, and light-absorbing dyes into an organic solvent that is either slightly water-soluble or water-insoluble, and then emulsifying and dispersing the dissolved materials.

The thermosensitive recording medium produces no color with low thermal energy applied, so that it can be held stably in storage. To bring the thermosensitive recording medium into a desired colored condition, therefore, it is necessary to apply a considerable amount of thermal energy to the thermosensitive recording medium. As a result, the dynamic range of a recorded image is narrowed by a value corresponding to the threshold level of the thermal energy which is applied until the thermosensitive recording medium is colored, making it difficult to obtain a high-gradation image. In addition, the thermosensitive recording apparatus which causes the thermosensitive recording medium to be colored is subjected to a considerable burden.

The applicant has also proposed a thermosensitive recording apparatus for preheating a thermosensitive recording medium up to a certain temperature below a coloring temperature and thereafter applying a laser beam to the thermosensitive recording medium to produce a color thereon, as disclosed in Japanese patent application No. 5-38888. The proposed thermosensitive recording apparatus can produce a high-gradation image easily and highly accurately, and allows the burden on the heating means to be reduced.

It is known that the density of an image which is recorded on a thermosensitive recording medium by applying a predetermined amount of thermal energy thereto increases with time when held in storage at normal temperature. Therefore, images recorded on a thermosensitive recording medium have different densities immediately after they are recorded and upon elapse of a certain period of time after they are recorded. In view of such a drawback, the applicant has proposed a method of and an apparatus for thermally recording an image by applying a laser beam to a thermosensitive recording medium to record a visible image thereon and thereafter heating the thermosensitive recording medium again to a temperature lower than a coloring temperature, as disclosed in Japanese patent application No. 5-205965. The disclosed process accelerates a coloring reaction immediately after the image has been recorded, thereby producing an image of stable density.

However, the disclosed process is disadvantageous for the reasons given below. Since the thermosensitive recording medium is normally biaxially oriented, when the thermosensitive recording medium is heated to a temperature lower than a coloring temperature before and/or after an image is recorded, the thermosensitive recording medium is apt to shrink. When the thermosensitive recording medium is shrunk, the image recorded thereon is reduced in size. As a consequence, a desired image cannot be obtained on the thermosensitive recording medium.

SUMMARY OF THE INVENTION

It is therefore an object of the present invention to provide a method of and an apparatus for thermally recording an image of desired dimensions on a thermosensitive recording medium easily and reliably without being adversely affected by shrinkage or expansion caused when the thermosensitive recording medium is heated before or after the image is recorded thereon.

According to the present invention, there is provided a method of thermally recording an image on a thermosensitive recording medium, comprising the steps of applying thermal energy to a thermal recording medium to cause the thermosensitive recording medium to be colored for recording an image thereon, heating the thermosensitive recording medium to a temperature lower than a coloring temperature thereof before or after the image is recorded thereon, detecting an amount of thermal deformation by which the thermosensitive recording medium is deformed when heated to the temperature lower than the coloring temperature, and establishing a scanning interval employed when the image is to be recorded on the thermosensitive recording medium, depending on the detected amount of thermal deformation.

Preferably, the thermosensitive recording medium is produced by cutting off a biaxially oriented blank base including a plurality of arrays of thermosensitive recording mediums each located in one longitudinal position thereon, one of the arrays of thermosensitive recording mediums being used to record images thereon.

According to the present invention, the above object can also be achieved by an apparatus for thermally recording an image on a thermosensitive recording medium, comprising recording means for applying thermal energy to a thermal recording medium to cause the thermosensitive recording medium to be colored for recording an image thereon, heating means for heating the thermosensitive recording medium to a temperature lower than a coloring temperature thereof before or after the image is recorded thereon, and control means for establishing a scanning interval employed when the image is to be recorded on the thermosensitive recording medium, depending on an amount of thermal deformation by which the thermosensitive recording medium is deformed when heated to the temperature lower than the coloring temperature.

With the thermal recording method and apparatus according to the present invention, the amount of thermal deformation by which the thermosensitive recording medium is deformed when heated to the temperature lower than the coloring temperature is detected in advance, and a scanning interval employed when the image is to be recorded on the thermosensitive recording medium is established depending on the detected amount of thermal deformation. Therefore, even when the thermosensitive recording medium is shrunk due to the heat applied thereto, an image or the like can be recorded with desired dimensions on the thermosensitive recording medium.

Since the thermosensitive recording medium is produced by cutting off a biaxially oriented blank base including a plurality of thermosensitive recording mediums each located in one longitudinal position thereon, the thermosensitive recording mediums each located in one longitudinal position thereon have the same thermal shrinkage factor. Therefore, images or the like can be recorded highly accurately on a plurality of thermosensitive recording mediums having the same thermal shrinkage factor based on the scanning interval which has been established once.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
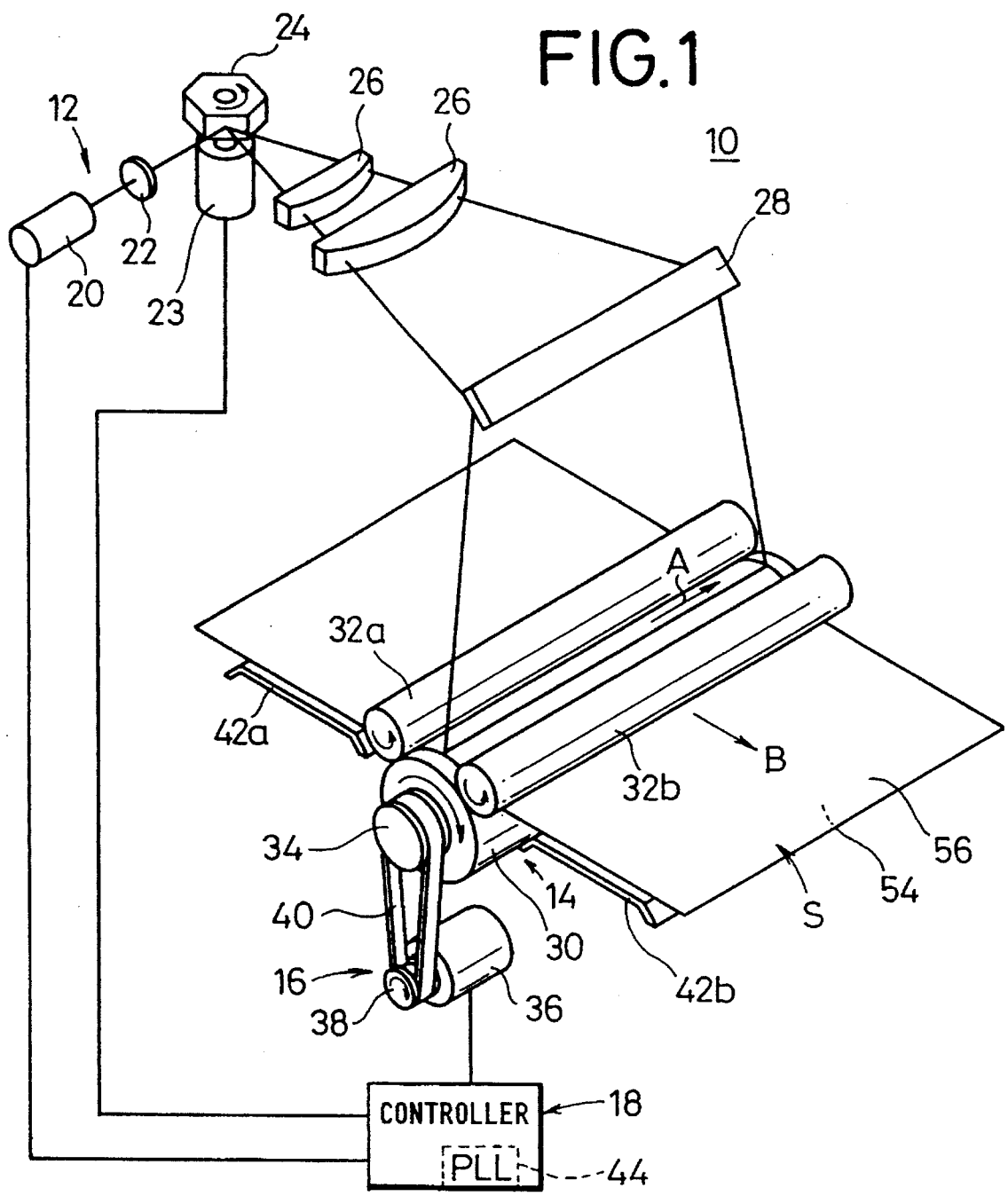
FIG. 1 is a schematic perspective view, partly in block form, of a thermal recording apparatus according to the present invention.

FIG. 1 shows a thermal recording apparatus, generally designated by the reference numeral 10, for carrying out a thermal recording method according to the present invention. In the thermal recording apparatus 10, a thermosensitive recording medium S which is fed in an auxiliary scanning direction indicated by the arrow B is scanned by a laser beam L in a main scanning direction indicated by the arrow A to record a two-dimensional image or the like on the thermosensitive recording medium S. The thermal recording apparatus 10 has a laser beam generator (recording means) 12 for applying thermal energy to the thermosensitive recording medium S to color the same to a certain density to record an image or the like thereon, a preheating device (heating means) 14 for preheating the thermosensitive recording medium S to a temperature lower than a coloring temperature at any time before or after the image is recorded, e.g., substantially at the same time that the image is recorded, an auxiliary scanning feeder 16 for feeding the thermosensitive recording medium S in the auxiliary scanning direction B, and a controller (control means) 18 including a phase-locked loop (PLL) circuit (described later on) for setting scanning intervals employed when the image is to be recorded on the thermosensitive recording medium S, depending on the amount of thermal deformation by which the thermosensitive recording medium S is deformed when it is heated to the temperature lower than the coloring temperature.

The laser beam generator 12 comprises a laser diode 20 for emitting a laser beam L, a cylindrical lens 22, a polygonal mirror 24 rotatable by a main scanning motor 23 in the direction indicated by the arrow for deflecting the laser beam L applied thereto, two f8 lenses 26, and a cylindrical mirror 28 which coacts with the cylindrical lens 22 to compensate for facet errors of the polygonal mirror 24. The laser diode 20 and the main scanning motor 23 are controlled by the controller 18.

The preheating device 14 comprises a heat roller 30 having a built-in heater (not shown) disposed therein. The heat roller 30 is also part of the auxiliary scanning feeder 16, which has a pair of spaced nip rollers 32a, 32b held in rolling contact with the heat roller 30. The auxiliary scanning feeder 16 also has a motor 36 such as a DC motor, a stepping motor, or the like, and a speed-reduction belt 40 which is trained around a shaft 34 of the heat roller 30 and a shaft 38 of the motor 36. The motor 36 is controlled by the controller 18. Two spaced guide plates 42a, 42b for contacting the lower surface of the thermosensitive recording medium S to hold the same are disposed one on each side of the heat roller 30 in the auxiliary scanning direction B.

Figure 2:
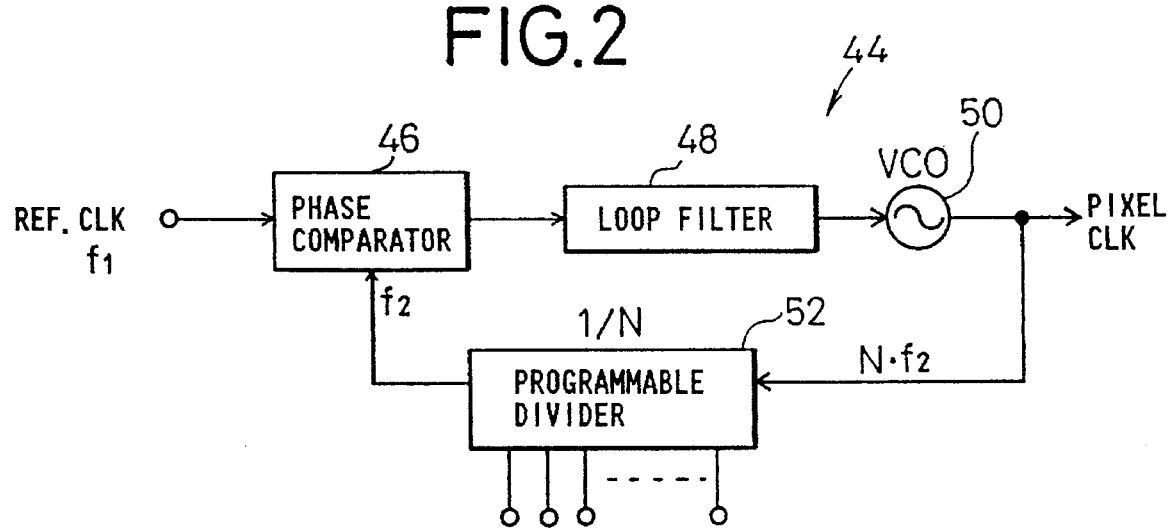
FIG. 2 is a block diagram of a PLL circuit in the thermal recording apparatus shown in FIG. 1.

The controller 18 has a PLL circuit 44 for setting scanning intervals employed when the image is to be recorded on the thermosensitive recording medium S, depending on the amount of thermal deformation by which the thermosensitive recording medium S is deformed when it is heated to the temperature lower than the coloring temperature. As shown in FIG. 2, the PLL circuit 44 comprises a phase comparator 46 for comparing the phase of a reference clock signal $f_1$ and the phase of a frequency-divided output signal $f_2$, a loop filter 48 for integrating a phase-comparison output signal from the phase comparator 46, a voltage-controlled oscillator 50 to which an output voltage from the loop filter 48 is applied as an oscillation frequency control voltage, and a programmable divider 52 for dividing the oscillation frequency of the voltage-controlled oscillator 50 at a frequency-dividing ratio based on a frequency-dividing-ratio control signal supplied from an external source thereby to produce the frequency-divided output signal $f_2$.

The thermosensitive recording medium S comprises a support 54 and a thermosensitive layer 56 disposed on the support 54. The thermosensitive layer 56 is made of a material which is composed of a coloring agent, a color developer, and light-absorbing dyes which absorb the laser beam L and convert the laser beam L into thermal energy. For example, the thermosensitive layer 56 may be made of a material as disclosed in Japanese laid-open patent publications Nos. 5-301447 and 5-24219.

Operation of the thermal recording apparatus 10 will be described below with respect to the thermal recording method according to the present invention.

Prior to recording an image on the thermosensitive recording medium S, the amount of thermal shrinkage (the amount of thermal deformation) by which the thermosensitive recording medium S is shrunk when it is preheated by the heat roller 30 is measured. Specifically, while the thermosensitive recording medium S is being fed in the auxiliary scanning direction B by the motor 36 controlled by the controller 18, the thermosensitive recording medium S is preheated by the heat roller 30 to a temperature immediately lower than a coloring temperature thereof.

Figure 3:
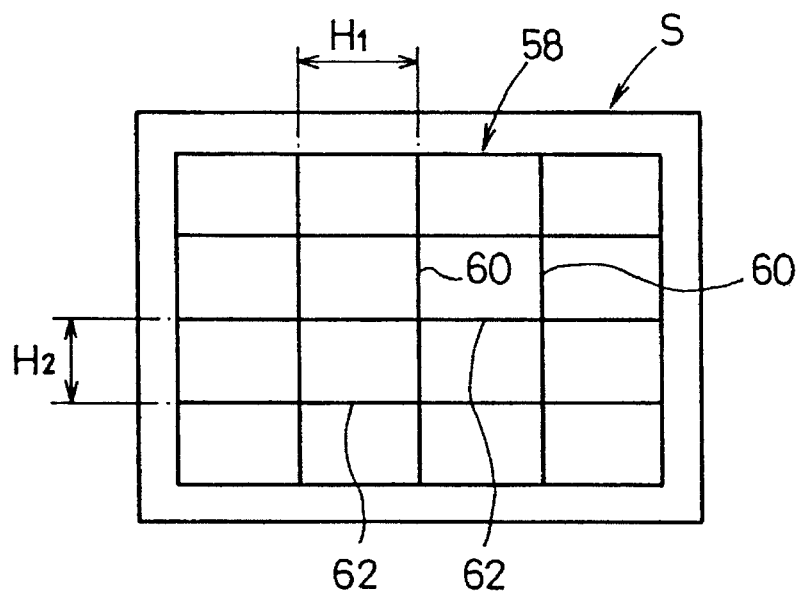
FIG. 3 is a view illustrative of a reference pattern to be recorded on a thermosensitive recording medium.

At substantially the same time that the thermosensitive recording medium S is preheated, the controller 18 energizes the laser diode 20 to emit a laser beam L which is modulated depending on the gradation of a measurement pattern, e.g., a grid pattern, to be recorded on the thermosensitive recording medium S. The laser beam L travels through the cylindrical lens 22 to the polygonal mirror 24, and is reflected by mirror facets of the polygonal mirror 24 which is rotated at a high speed by the main scanning motor 23. Thereafter, the laser beam L passes through the f8 lenses 26 and the cylindrical mirror 28 to the thermosensitive recording medium S. The laser beam L, which is deflected by the polygonal mirror 24, scans the thermosensitive recording medium S in the main scanning direction A while the thermo-sensitive recording medium S is fed in the auxiliary scanning direction B. At this time, a certain level of thermal energy which corresponds to the coloring temperature is imparted to the thermosensitive layer 56 of the thermosensitive recording medium S by the laser beam L, thereby recording a predetermined grid pattern 58 (see FIG. 3).

The grid pattern 58 recorded on the thermosensitive recording medium S has parallel pattern lines 60 extending in the main scanning direction A and parallel pattern lines 62 extending in the auxiliary scanning direction B. The distance H1 between the pattern lines 60 and the distance H2 between the pattern lines 62 are measured. The measured distances H1, H2 are subtracted from predetermined reference distances between such pattern lines of the grid pattern 58 in the main and auxiliary scanning directions A, B, thus calculating thermal shrinkage factors respectively in the main and auxiliary scanning directions A, B.

Then, scanning intervals employed when an image is to be recorded on the thermosensitive recording medium S is established depending on the thermal shrinkage factors in the main and auxiliary scanning directions A, B. Specifically, in order to establish a scanning interval in the main scanning direction A, a pixel clock rate is varied. As shown in FIG. 2, a pixel clock signal is produced as an output clock signal (frequency-divided block signal) from the PLL circuit 44. If the frequency-dividing ratio supplied to the programmable divider 52 is increased, then the frequency of the pixel clock signal is increased, commensurately reducing the size of the image. If the frequency-dividing ratio supplied to the programmable divider 52 is reduced, then the frequency of the pixel clock signal is reduced, commensurately increasing the size of the image.

Alternatively, a clock signal to control the main scanning motor 23 which rotates the polygonal mirror 24 may be controlled in the same manner as described above for enlarging or reducing the image thereby to establish a scanning interval in the main scanning direction A.

In order to establish a scanning interval in the auxiliary scanning direction B, the controller 18 controls a clock signal to control the motor 36 in the same manner as described above for enlarging or reducing the image in the auxiliary scanning direction B.

In this embodiment, the thermal shrinkage factors of the thermosensitive recording medium S are measured in advance, and scanning intervals respectively in the main and auxiliary scanning directions A, B at the time an image is to be recorded on the thermosensitive recording medium S are set to relatively long values depending on the thermal shrinkage factors. Therefore, even when the thermosensitive recording medium S with an image recorded thereon by the thermal recording apparatus 10 is thermally shrunk into a reduced overall size, the recorded image is maintained accurately at desired dimensions. Since the controller 18 has only the PLL circuit 44, the thermal recording apparatus 10 is prevented from becoming complex in structure and unduly expensive.

Figure 4:
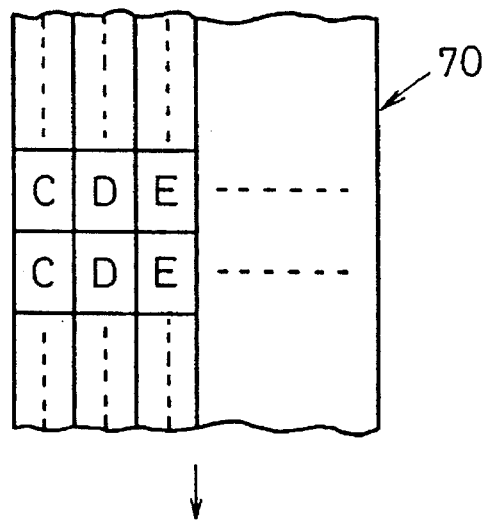
FIG. 4 is a fragmentary view showing a blank base of the thermosensitive recording medium.

As shown in FIG. 4, the thermosensitive recording medium S is produced by cutting off a blank base 70 which has been biaxially oriented. Specifically, the blank base 70 includes a plurality of arrays of thermosensitive recording mediums C, D, E each located in one longitudinal position thereon and having the same shrinkage factor, and one of the arrays of thermosensitive recording mediums C, D, E is used as the thermosensitive recording medium S. When the blank base 70 is manufactured, the shrinkage factor may possibly differ depending on the position on the blank base 70. To avoid using thermosensitive recording mediums having different shrinkage factors in the thermal recording apparatus 10, a plurality of thermosensitive recording mediums C, D, or E which have the same shrinkage factor are loaded as thermosensitive recording mediums S in the thermal recording apparatus 10, and images or the like are recorded on the loaded thermosensitive recording mediums. In this manner, images or the like can be recorded highly accurately and efficiently on the thermosensitive recording mediums S based on scanning intervals that have been established once.

In the illustrated embodiment, only the preheating device 14 is employed as the heating means. However, the thermal recording apparatus may have a postheating device for reheating the thermosensitive recording medium S to the temperature below the coloring temperature after an image has been recorded on the thermosensitive recording medium S by the laser beam L. The principles of the present invention are also applicable to a thermosensitive recording medium which is expanded when heated.

Although a certain preferred embodiment of the present invention has been shown and described in detail, it should be understood that various changes and modifications may be made therein without departing from the scope of the appended claims.

What is claimed is:

1. A method of thermally recording an image on a thermosensitive recording medium, comprising the steps of:

applying thermal energy to a thermal recording medium to cause the thermosensitive recording medium to be colored for recording an image thereon;

heating the thermosensitive recording medium to a temperature lower than a coloring temperature thereof before or after the image is recorded thereon;

detecting an amount of thermal deformation by which the thermosensitive recording medium is deformed when heated to the temperature lower than the coloring temperature; and establishing a scanning interval employed when the image is to be recorded on the thermosensitive recording medium, depending on the detected amount of thermal deformation.

2. A method according to claim 1, wherein said thermosensitive recording medium is produced by cutting off a biaxially oriented blank base including a plurality of arrays of thermosensitive recording mediums each located in one longitudinal position thereon, one of the arrays of thermosensitive recording mediums being used to record images thereon.

3. An apparatus for thermally recording an image on a thermosensitive recording medium, comprising:

recording means for applying thermal energy to a thermal recording medium to cause the thermosensitive recording medium to be colored for recording an image thereon;

heating means for heating the thermosensitive recording medium to a temperature lower than a coloring temperature thereof before or after the image is recorded thereon; and control means for establishing a scanning interval employed when the image is to be recorded on the thermosensitive recording medium, depending on an amount of thermal deformation by which the thermosensitive recording medium is deformed when heated to the temperature lower than the coloring temperature.

* * * * *